US012789112B2

(12) United States Patent
Gillis et al.

(10) Patent No.: US 12,789,112 B2
(45) Date of Patent: Nov. 10, 2026

(54) REACTIVE DISTILLATION SYSTEM AND METHOD FOR PRODUCTION OF HYDROGEN FROM HYDRIODIC ACID

(71) Applicant: Thiozen Inc., Pasadena, CA (US)

(72) Inventors: Ryan Joseph Gillis, La Crescenta, CA (US); Rachid Taha, Dublin, OH (US); Te-Chun Chu, Houston, TX (US)

(73) Assignee: Thiozen Inc., Pasadena, CA (US)

( * ) Notice: Subject to any disclaimer, the term of this patent is extended or adjusted under 35 U.S.C. 154(b) by 154 days.

(21) Appl. No.: 18/780,946

(22) Filed: Jul. 23, 2024

(65) Prior Publication Data

US 2025/0032951 A1 Jan. 30, 2025

Related U.S. Application Data

(60) Provisional application No. 63/515,215, filed on Jul. 24, 2023.

(51) Int. Cl.
*B01D 3/36* (2006.01)
*B01D 3/00* (2006.01)
(Continued)

(52) U.S. Cl.
CPC ............... *B01D 3/009* (2013.01); *B01D 3/36* (2013.01); *B01D 5/0063* (2013.01); (Continued)

(58) Field of Classification Search
CPC ........ B01D 3/009; B01D 3/36; B01D 5/0063; B01D 53/047; B01D 53/1431; (Continued)

(56) References Cited

U.S. PATENT DOCUMENTS 4,089,939 A * 5/1978 Norman .................. C01B 3/103 423/481
4,127,644 A * 11/1978 Norman .................. C01B 3/103 423/481

(Continued)

FOREIGN PATENT DOCUMENTS

CN 113086945 A 7/2021
CN 113233415 A 8/2021

(Continued)

OTHER PUBLICATIONS

Notification of Transmittal of the International Search Report and the Written Opinion of the International Searching Authority, or the Declaration for International Application No. PCT/US2024/039143, "Reactive Distillation System and Method for Production of Hydrogen from Hydriodic Acid" date of mailing: Nov. 29, 2024.

(Continued)

*Primary Examiner* — Jonathan Miller
(74) *Attorney, Agent, or Firm* — Hamilton, Brook, Smith & Reynolds, P.C.

(57) ABSTRACT

A reactive distillation system for decomposition of hydriodic acid into hydrogen gas and iodine, with optional secondary purification unit(s) is described. Methods for using the reactive distillation system with optional secondary purification unit(s) for the decomposition of hydriodic acid into hydrogen gas and iodine is also described. When the purification unit is present, the system and methods of the disclosure can be used for the production and purification of hydrogen from hydriodic acid.

20 Claims, 3 Drawing Sheets

(51) Int. Cl.

| | |
|---|---|
| ***B01D 5/00*** | (2006.01) |
| ***B01D 53/047*** | (2006.01) |
| ***B01D 53/14*** | (2006.01) |
| ***B01D 53/18*** | (2006.01) |
| ***C01B 3/04*** | (2006.01) |
| ***C01B 3/52*** | (2006.01) |
| ***C01B 3/56*** | (2006.01) |

(52) U.S. Cl.
CPC ....... *B01D 53/047* (2013.01); *B01D 53/1431* (2013.01); *B01D 53/1493* (2013.01); *B01D 53/18* (2013.01); *C01B 3/04* (2013.01); *C01B 3/52* (2013.01); *C01B 3/56* (2013.01); *B01D 2252/103* (2013.01); *B01D 2253/102* (2013.01); *B01D 2253/108* (2013.01); *B01D 2256/16* (2013.01); *C01B 2203/0272* (2013.01); *C01B 2203/0415* (2013.01); *C01B 2203/043* (2013.01); *C01B 2203/1288* (2013.01)

(58) Field of Classification Search
CPC ...... B01D 53/1493; B01D 53/18; C01B 3/04; C01B 3/52; C01B 3/56
See application file for complete search history.

(56) References Cited

U.S. PATENT DOCUMENTS

| | | | | |
|---|---|---|---|---|
| 4,435,595 | A | 3/1984 | Agreda et al. | |
| 5,917,089 | A | 6/1999 | Howard | |
| 6,083,378 | A * | 7/2000 | Gildert | B01D 3/14 208/213 |
| 8,506,925 | B1 * | 8/2013 | No | C01B 3/04 423/481 |
| 9,233,907 | B1 | 1/2016 | Shaver et al. | |
| 9,447,018 | B2 * | 9/2016 | Gadewar | C07C 67/58 |
| 11,167,242 | B1 * | 11/2021 | Parker | C10L 3/103 |
| 2012/0178962 | A1 * | 7/2012 | Gadewar | B01D 3/001 422/187 |
| 2013/0195749 | A1 | 8/2013 | No et al. | |
| 2014/0012037 | A1 * | 1/2014 | Gadewar | B01D 3/009 422/187 |
| 2020/0368667 | A1 * | 11/2020 | Obata | C01B 3/56 |
| 2020/0369518 | A1 | 11/2020 | Greet et al. | |

FOREIGN PATENT DOCUMENTS

| | | | |
|---|---|---|---|
| WO | 2004026805 | A1 | 4/2004 |
| WO | 2025024440 | A1 | 1/2025 |

OTHER PUBLICATIONS

Belaissaoui et al: "Vapour reactive distillation process for hydrogen production by HI decomposition from HI-I"2-H"2O solutions", Chemical Engineering and Processing: Process Intensification, Elsevier Sequoia, Lausanne, CH, vol. 47, No. 3, Jan. 7, 2008.

Roth, M., et al., Thermochemical Water Splitting Through Direct Hi-Decomposition from H20/HI/I2 Solutions, Int. J. Hydrogen Energy, 14 (1989), pp. 545-549.

Murphy IV, J.E., et al., Process simulations of HI decomposition via reactive distillation in the sulfur-iodine cycle for hydrogen manufacture, Int. J. Hydrogen Energy, 37 (2012), pp. 4002-4011.

Subhasis Mandal, A., Simulating reactive distillation of HIx (HI-H2O-12) system in Sulphur-Iodine cycle for hydrogen production, Nuclear Engineering and Technology, vol. 52, Issue 2, 2020, pp. 279-286.

* cited by examiner

REACTIVE DISTILLATION SYSTEM AND METHOD FOR PRODUCTION OF HYDROGEN FROM HYDRIODIC ACID

RELATED APPLICATIONS

This application claims the benefit of U.S. Provisional Application No. 63/515,215, filed on Jul. 24, 2023. The entire teachings of the above application(s) are incorporated herein by reference.

BACKGROUND

Hydrogen iodide is a colorless vapor that readily dissolves in aqueous solutions to create a transparent solution of hydriodic acid. This acid is completely ionized in water forming iodide and hydronium ions. The mixture has an azeotrope at approximately 57 wgt % hydrogen iodide. Hydriodic acid is an important intermediate in the creation of hydrogen from either water or hydrogen sulfide.

An important step in each of these processes is the decomposition of concentrated hydriodic acid mixtures into hydrogen gas and iodine.

As the market seeks more efficient methods for hydrogen gas production, the ability to create hydrogen from hydrogen sulfide streams increases in value.

SUMMARY

The present disclosure describes a reactive distillation system designed for the simultaneous reaction and separation of hydrogen, hydriodic acid, iodine, and water mixtures as part of the production of hydrogen from hydrogen sulfide. Additionally, an optional secondary purification unit(s) is described. Methods for using the reactive distillation system with optional secondary purification unit(s) for the decomposition of hydriodic acid into hydrogen gas and iodine are also described. The system and methods of the disclosure can be used for the production and purification of hydrogen from hydriodic acid.

The distillation column of the disclosure is distinct in both its design and application. The column described in this disclosure has an inlet with a much higher hydriodic acid content than designs where iodine was a primary component (often over 30 mol %).

BRIEF DESCRIPTION OF THE DRAWINGS

For a better understanding of the present disclosure, reference is made to the drawings below, in which like elements are referenced with like numerals, and in which.

DETAILED DESCRIPTION

Figure 1:
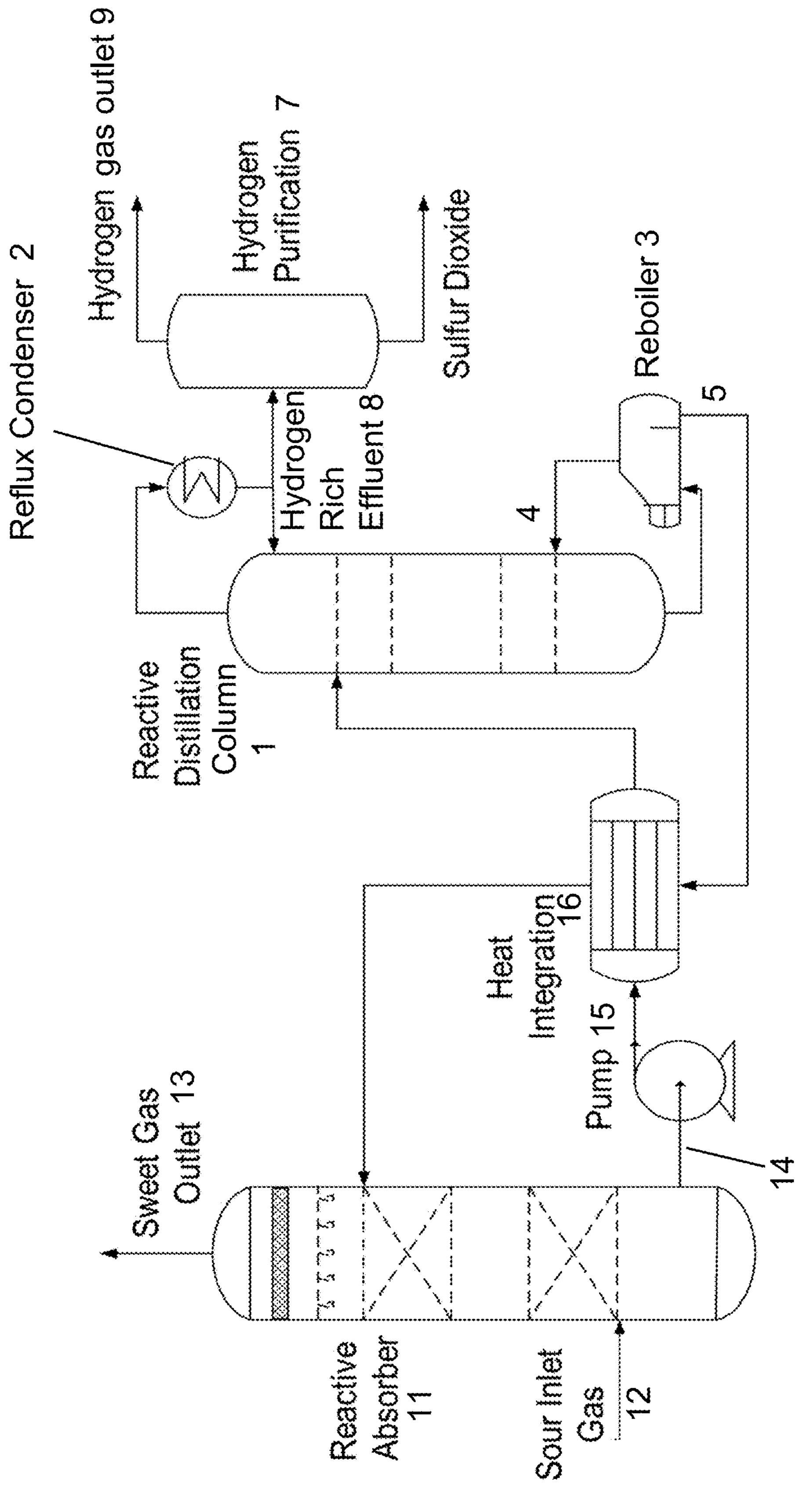
FIG. 1 is an example diagram of a hydrogen from hydrogen sulfide chemical cycle using a reactive distillation system of the disclosure and a hydrogen purification unit.

The present disclosure describes methods and a reactive distillation column system designed for the simultaneous reaction and separation of hydrogen, hydriodic acid, iodine, and water mixtures, as part of the production of hydrogen from hydrogen sulfide. The hydrogen sulfide comes from but not limited to raw natural gas, oil refinery streams, gasifier gas stream in coal gasification, natural hydrogen extraction process at the subsurface, and wastewater treatment.

In an embodiment, the disclosure is directed to a reactive distillation system for decomposition of hydriodic acid into hydrogen gas and iodine. The reactive distillation system comprises a reactive distillation column, a reboiler, and a reflux condenser, wherein the reactive distillation column has a column inlet stream comprising a mixture of hydriodic acid and water. In an embodiment, the reactive distillation system further comprises one or a plurality of secondary purification unit(s) for further processing of one or more process streams.

In another embodiment, the reactive distillation system described herein can be used in a method for the decomposition of hydriodic acid into hydrogen gas and iodine. The method comprises introducing a mixture of hydriodic acid and water into the reactive distillation column of a reactive distillation system, wherein the reactive distillation column has a column inlet stream comprising a mixture of hydriodic acid and water. In one embodiment, the hydriodic acid concentration is up to its azeotrope of about 57 wgt %. In other embodiments, the hydriodic acid concentration is slightly higher than the azeotropic concentration, such as about 57 wgt % to about 62 wgt %. In yet another embodiment, the hydriodic acid concentration can be from about 5 wgt % to about 62 wgt %.

In an embodiment, a method for decomposition of hydriodic acid into hydrogen gas comprises: providing a reactive distillation system comprising a reactive distillation column, a reboiler, and a reflux condenser; processing an inlet mixture of hydriodic acid and water in the reactive distillation column under conditions to create an ascending vapor phase and a descending liquid phase of the hydriodic acid and water; directing the liquid phase of hydriodic acid and water through an outlet at the bottom of the column into the reboiler where the hydriodic acid and water are partially vaporized and returned to the column and the remaining liquid exits the system; and directing the vapor phase through an outlet at the top of the column into a reflux condenser where the vapor phase is partially condensed with the liquid portion returned to the column and the remaining hydrogen-rich vapor exiting the system.

In an embodiment of the method, the reactive distillation system further comprises one or a plurality of secondary purification unit(s) for further processing of one or more process streams, such as to produce high purity hydrogen gas. These purification devices can be comprised of bubble columns, Venturi scrubbers, falling film absorbers, tray columns, packed bed columns that could use water, caustic or other liquids as an absorbent. They might also utilize pressure swing purification units with carbon, zeolite, silica gel beds, or combinations of these.

In yet another embodiment, the disclosure provides a method for decomposition of hydriodic acid into hydrogen gas, comprising decomposing hydriodic acid and water using a reactive distillation system comprising a reactive distillation column, a reboiler, and a reflux condenser; and collecting hydrogen gas.

The reactive distillation system and methods achieve the production of hydrogen from hydriodic acid in a simplified process with increased efficiency. The decomposition process proceeds in a single-pass through the reactive distillation system to simultaneously perform vaporization, reaction, condensation and separation across multiple stages of the system. Using a reactive distillation process rather than complete vaporization, catalyzed reaction, and condensation can save costs and lower the energy use of the underlying process [M. Roth and K. F. Knoche, *Int. J. Hydrogen Energy,* 14 (1989), pp. 545-549] [J. E. Murphy IV and J. P. O'Connell, *Int. J. Hydrogen Energy,* 37 (2012), pp. 4002-4011] [Subhasis Mandal, Amiya K. Jana, *Nuclear Engineering and Technology*, Volume 52, Issue 2, 2020, Pages 279-286].

The reaction of HI is thermodynamically limited based on the temperature of the reactor (for example at about 325° C., the thermodynamic limit of HI conversion in an azeotropic mixture is about 20%). This means that without reactive distillation or some other form of continuous separation, the single pass conversion is limited to about 20% at about 325° C.

The reactive distillation system of the disclosure comprises a staged reactive distillation column where the reaction occurs in the vapor phase between the stages, a reboiler sized to raise the temperature of the liquid stream to near the boiling point of the about azeotropic mixture at the inlet pressure, thus inducing partial vaporization of the hydriodic acid stream component, a reflux condenser sized to condense the majority of the non-hydrogen vapor phase components exiting the top of the column, and optionally one or a plurality of secondary purification units used to remove the remaining impurities from the hydrogen product. The number of stages created by plates or trays will depend on the system design, such as 4 to 5 stages to up to 100 stages (for example 10, 20, 30, 40, 50, 60, 70, 80, 90, 100 stages).

The first three components of the reactive distillation system (column, reboiler and reflux condenser) together comprise a reactive distillation column with both reboiling and reflux capabilities. The purpose of this set of components is to facilitate the reaction of hydriodic acid converting to hydrogen and iodine and to separate the hydrogen product from the iodine product.

The reactive distillation column comprises a tray column with a reflux condenser on the vapor phase outlet and a reboiler on the liquid phase outlet. The column inlet is comprised of a mixture of hydroiodic acid and water, with hydroiodic acid concentration up to its azeotrope, of about 57 wt %, or slightly higher than the azeotropic concentration, such as about 57 wt % to about 62 wt %. Other variations will also contain solvated sulfur dioxide/sulfurous acid in addition to the other stream components. This liquid phase may also contain impurities of sulfuric acid, hydrocarbons, polythionic acids, and other chemicals. The primarily hydriodic acid mixture undergoes homogenous thermal decomposition in the vapor phase of the reactive distillation column producing hydrogen gas and iodine. These products along with unreacted inlet components are separated by the distillation column into a primarily hydrogen and water vapor phase that exits the top of the column and a primarily water, iodine, hydriodic phase that exits as a liquid at the bottom of the column. In variations of the process, significant sulfur dioxide/sulfurous acid content will exit with the vapor phase.

In operation, as depicted in FIG. 1, a reactive absorber (11) takes sour inlet gas (12) to react with a liquid mixture of water, hydroiodic acid, and iodine. The iodine and water in the liquid mixture reacts with hydrogen sulfide in the sour inlet gas (12), resulting in hydrogen iodide and sulfur dioxide as products. The hydrogen sulfide is reacted and removed from the gas stream, and the sweet gas exits the top of the reactive absorber through sweet gas outlet (13). The reaction increases the concentration of hydroiodic acid in the liquid phase, exiting the bottom of the reactive absorber through outlet (14). A pump (15) can be used to transfer the liquid from the reactive absorber (11) to the reactive distillation column (1), and a heat integration unit (16) can be installed between the reactive absorber (11) and the reactive distillation column (1) to exchange heat and increase the overall process heat efficiency.

Figure 2:
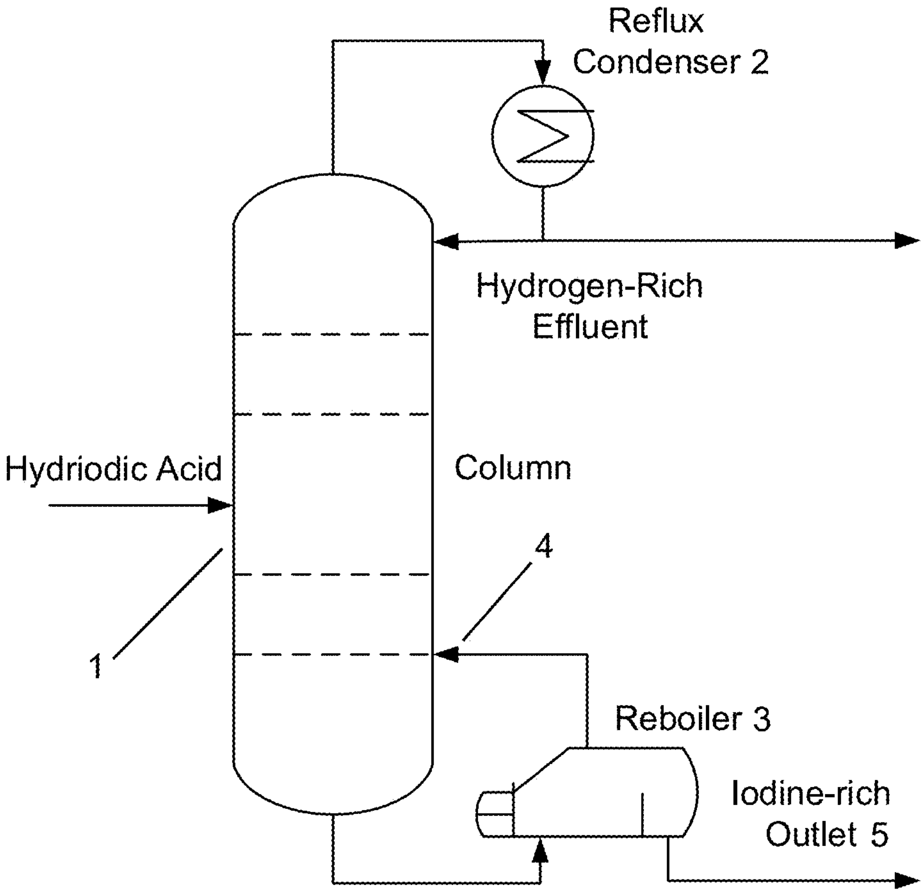
FIG. 2 is an example embodiment of a reactive distillation system of the disclosure, as applied to the decomposition of about azeotropic mixtures of hydriodic acid and water.

With reference to FIG. 1 and FIG. 2, a liquid stream of hydriodic acid and water enters the reactive distillation column (1) where it is heated and partially vaporized by an ascending vapor phase comprised of water, hydriodic acid, and hydrogen. The hydrogen-producing reaction occurs principally in the vapor phase between the stages of the column. This vapor phase rises to the top of reactive distillation column (1) where it is partially condensed by the reflux condenser (2). The remaining hydrogen-rich vapor leaves the reactive distillation column (1) while the newly condensed liquid is fed back to near the top of the column where it descends, eventually meeting the portion of the inlet stream that was not vaporized. This descending liquid stream comprised of water, hydriodic acid, and iodine falls further and eventually reaches the reboiler (3) where the mixture of hydriodic acid and water is partially vaporized and returned to the reactive distillation column (1) via the reboiler outlet (4) to form the base of the ascending column of vapor. The non-vaporized iodine-rich component of the stream exits the reboiler via the iodine-rich outlet (5).

Both the ascending vapor phase and the descending liquid phase are forced into intimate contact allowing equilibrium between the phases, and facilitating the absorption of iodine into the liquid from the reacting vapor. This continuous removal of the reaction product allows greater production of hydrogen than would otherwise be possible.

In an embodiment, the reactive distillation column can be, but is not limited to, a staged column having between 4 to 100 stages, or a packed column with packing materials comprised of ceramics, glass, alumina, other inert materials, or combination of these. The reactive distillation column would be operated close to the inlet pressure of the hydriodic acid inlet. This pressure could vary, for example between about atmospheric and about 40 barg. Temperatures in the column would remain close to the boiling point of the hydriodic acid mixture at the column pressure, and as such would range between about 127° C. and about 300° C.

In an embodiment, the reboiler can comprise, but is not limited to, kettle reboiler, thermosyphon, fired reboiler, or forced circulation reboiler. This reboiler would operate at a higher temperature than the reactive column and a pressure equal to the inlet pressure of hydriodic acid plus the pressure drop across the column to this inlet. This pressure drop will vary with the size of the reactor, but in general the pressure of this reboiler would vary between close to about atmospheric and about 40 barg. Similarly, temperature would be at the boiling point of the liquid at the operating pressure inducing partial vaporization. This temperature would range between about 127° C. and about 250° C.

In an embodiment, the reflux condenser can comprise, but is not limited to, a shell and tube heat exchanger, plate heat exchanger, or double pipe heat exchanger with coolant in either co-current or counter-current flow. The reflux condenser would operate at a pressure very close to the column itself, thus between about atmospheric and about 40 barg. The temperature of the reflux will be low enough to condense the majority of the water, hydriodic acid, and iodine components of the vapor inlet returning them as a liquid to the column while allowing the exit of a hydrogen-rich vapor. This temperature will vary between about 25° C. and about 250° C.

Figure 3:
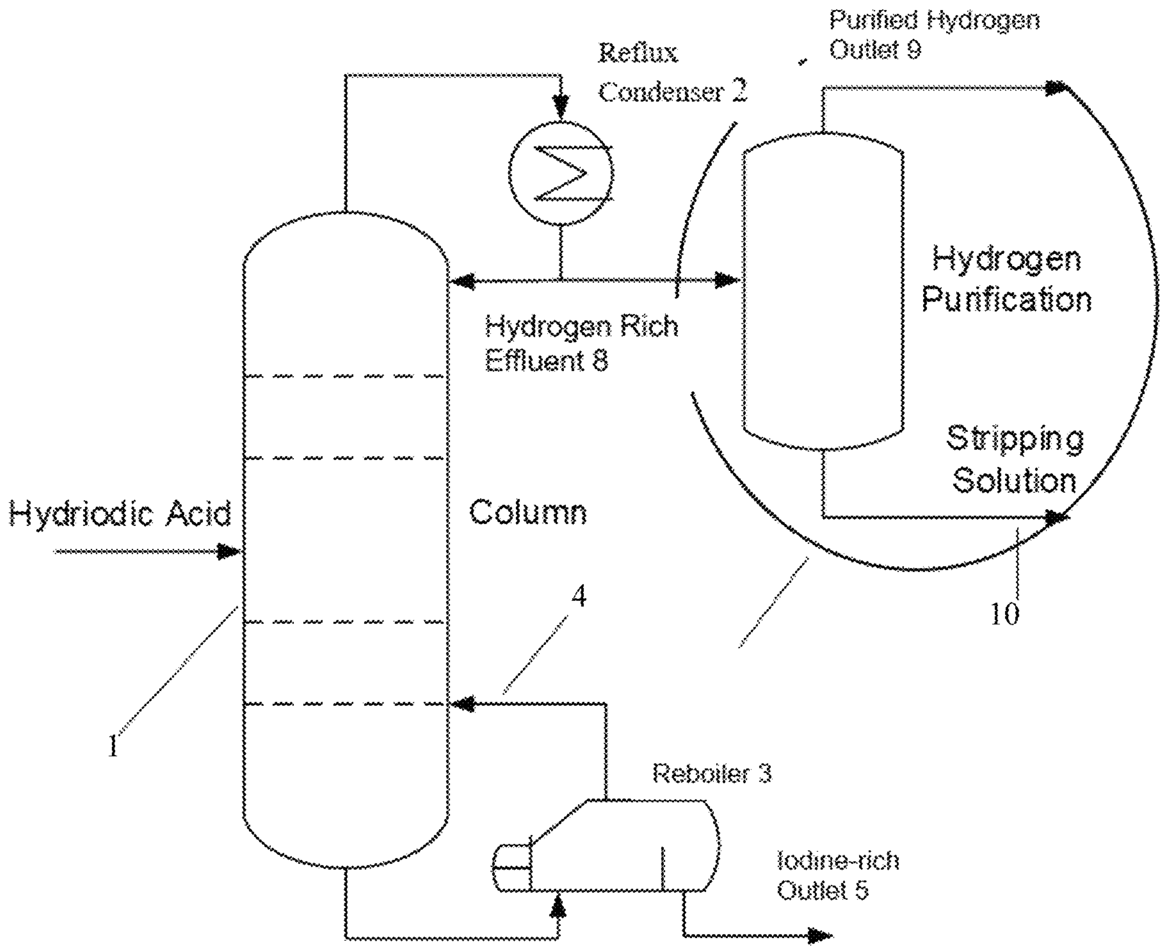
FIG. 3 is an example embodiment of a reactive distillation system of the disclosure, with a secondary purification unit, for example for hydrogen purification.

In another aspect of the disclosure, described are methods for the production and purification of hydrogen from hydriodic acid using a combination of the reactive distillation system of the disclosure and at least one secondary purification unit. One or a plurality of secondary purification unit(s) can be used in the system's design for the purpose of separating contaminants from the hydrogen product stream to produce hydrogen of an acceptable purity for downstream uses, such as but not limited to local use or compression and transportation. The purity requirements will depend on the application but could be between 95% for combustion gases and 99.999% for ammonia production. This purification may be accomplished across one or multiple steps of wet scrubbing, membrane purification, pressure swing adsorption, or other methods. A system illustrating a single secondary purification unit for hydrogen purification is exemplified in FIGS. 1 and 3. In operation, hydrogen gas to be purified enters the hydrogen purification unit (7) via inlet (8) and after being processed. Purified hydrogen gas exits outlet (9) and impurities, such as sulfur dioxide, are collected through impurities outlet (10). In FIG. 1, hydrogen is purified through its separation from sulfur dioxide and other gas impurities, and it can be done by membrane purification or pressure swing adsorption. In FIG. 3, some liquid stripping solution is used to purify hydrogen by removing components like hydrogen sulfide and hydrocarbons. If more than one secondary purification unit is added to the system, the more than one secondary purification unit can be added in series or in parallel to the outlet of the reactive distillation column system. The arrangement of such secondary purification units will be known to the skilled person depending upon the impurities present and potentially collected, recycled or disposed of.

In an embodiment, a secondary purification unit can comprise, but is not limited to, a bubble column, Venturi scrubber, falling film absorber, tray column, or packed bed column. For example, the packed bed column can be a packed bed column using water or caustic as the absorbing liquid.

In another embodiment, the secondary purification unit is a hydrogen purification unit. The hydrogen purification unit can comprise a pressure swing across activated carbon, zeolite, or silica gel beds, or combination of these.

Each component of the disclosure is in contact with concentrated acidic liquids and vapors. As such, extreme care must be exercised in the selection of materials for construction of the reactive distillation system and other components of the disclosure. Materials with exemplary acid corrosion resistance (such as tantalum, silicon carbide, etc.) are acceptable for the reactive distillation system and other components of this disclosure.

The present method has many advantages. Principally, the single-pass conversion of the system of the disclosure is lifted beyond the thermodynamic limit by the continuous removal of iodine from the reacting vapor phase of the system. Additionally, only a portion of the liquid stream needs to be vaporized prior to reaction, achieving energy efficiencies. Together these improvements stand to significantly reduce the energy requirements of the system, lowering the costs and carbon intensities of the process.

In one embodiment, the system can accommodate an inlet liquid stream with a flow rate of about 20 gpm and a mixture of hydroiodic acid and water, with hydroiodic acid concentration up to its azeotrope of about 57 wt %, or slightly higher than the azeotropic concentration, such as about 57 wt % to about 62 wt %. In an example embodiment, the composition of the liquid stream comprises:

Between about 5 to about 62 wgt % hydriodic acid, for example about 30 wgt %

Between about 0 to about 8 wgt % sulfur dioxide/sulfurous acid, for example about 4 wgt %

Between about 10 to about 95 wgt % water, for example about 65 wgt %

Between about 0 to about 10 wgt % ammonia, for example about 0 wgt %

Between 0 and about 2 wgt % other impurities including iodine, light hydrocarbons (e.g., C1-C4), nitrogen, mercaptans, and other sulfur containing species, for example about 1 wgt %

This liquid stream enters a column of the reactive distillation system of the disclosure, for example a tray column about 3 ft in diameter with 12 trays spaced about 1.5 feet apart. The bottom reboiler has a duty of about 5 MMBTU/hr supplied by, for example a hot oil kettle reboiler. From the liquid outlet is a stream comprising a composition of:

Between about 5 to about 60 wgt % hydriodic acid, for example about 10 wgt %

Between about 0 to about 8 wgt % sulfur dioxide/sulfurous acid, for example about 0 wgt %

Between about 10 to about 95 wgt % water, for example about 79 wgt % Between about 0 to about 10 wgt % ammonia, for example about 0 wgt %

Between about 1 to about 20 wgt % iodine, for example about 10 wgt %

Between 0 and 2 wgt % other impurities including light hydrocarbons (e.g., C1-C4), nitrogen, mercaptans, and other sulfur containing species, for example about 1 wgt %

The reflux condenser has a duty of about 3 MMBTU/hr supplied by, for example cooling water at a temperature of about 60° F. (about 15.6° C.). The vapor outlet is a stream comprising a composition of:

Between about 1 to about 100 wgt % hydrogen, for example about 80 wgt %

Between about 0 to about 20 wgt % sulfur dioxide/sulfurous acid, for example about 9 wgt %

Between about 1 to about 50 wgt % water, for example about 10 wgt %

Between about 0 to about 10 wgt % ammonia, for example about 0 wgt %

Between about 0 to about 2 wgt % iodine, for example about 0 wgt %

Less than about 2 wgt % other impurities including light hydrocarbons (e.g., C1-C4), nitrogen, mercaptans, and other sulfur containing species, for example about 1 wgt %

This vapor stream passes through secondary purification unit, for example, a water scrubber to remove the sulfur dioxide and impurities producing a final hydrogen product with a, for example, about 99% dry purity.

DEFINITIONS

It is to be understood that the terminology used herein is for describing particular embodiments only and is not intended to be limiting. Unless defined otherwise, all technical and scientific terms used herein have the same meaning as commonly understood by one of ordinary skill in the art to which the disclosure pertains.

Although any methods and materials similar or equivalent to those described herein may be used in the practice for testing of the present disclosure, exemplary materials and methods are described herein.

When a list is presented, unless stated otherwise, it is to be understood that each individual element of that list, and every combination of that list, is a separate embodiment. For example, a list of embodiments presented as “A, B, or C” is to be interpreted as including the embodiments, “A,” “B,” “C,” “A or B,” “A or C,” “B or C,” or “A, B, or C.”

As used in this specification and the appended claims, the singular forms “a,” “an,” and “the” include plural referents unless the content clearly dictates otherwise. The conjunctive term “and/or” between multiple recited elements is understood as encompassing both individual and combined options. For instance, where two elements are conjoined by “and/or,” a first option refers to the applicability of the first element without the second. A second option refers to the applicability of the second element without the first. A third option refers to the applicability of the first and second elements together. Any one of these options is understood to fall within the meaning, and therefore satisfy the requirement of the term “and/or” as used herein. Concurrent applicability of more than one of the options is also understood to fall within the meaning, and therefore satisfy the requirement of the term “and/or.”

Unless the context requires otherwise, throughout the specification and claims that follow, the word “comprise” and synonyms and variants thereof such as “have” and “include”, as well as variations thereof, such as “comprises” and “comprising”, are to be construed in an open, inclusive sense, e.g., “including, but not limited to.” The transitional terms “comprising,” “consisting essentially of,” and “consisting of” are intended to connote their generally accepted meanings in the patent vernacular; that is, (i) “comprising,” which is synonymous with “including,” “containing,” or “characterized by,” is inclusive or open-ended and does not exclude additional, unrecited elements or method steps; (ii) “consisting of” excludes any element or step not specified in the claim; and (iii) “consisting essentially of” limits the scope of a claim to the specified materials or steps “and those that do not materially affect the basic and novel characteristic(s)” of the claimed invention. Embodiments described in terms of the phrase “comprising” (or its equivalents) also provide as embodiments those independently described in terms of “consisting of” and “consisting essentially of.”

“About” means within an acceptable error range for the particular value as determined by one of ordinary skill in the art, which will depend in part on how the value is measured or determined, i.e., the limitations of the measurement system. Unless explicitly stated otherwise within the disclosure, claims, result or embodiment, “about” means within one standard deviation per the practice in the art, or can mean a range of ±20%, ±10%, ±5%, ±4, ±3, ±2 or ±1% of a given value. It is to be understood that the term “about” can precede any particular value specified herein, except for particular values used in the Examples. For example, an “about” azeotropic mixture of hydriodic acid and water will include 57% by weight (±3-5%).

“High purity” hydrogen gas produced according to the disclosure will depend on the application but could be between about 95% for combustion gases and about 99.999% for ammonia production.

All percents are intended to be weight percent unless otherwise specified. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for decomposition of hydriodic acid into hydrogen gas, comprising:

reacting a sour inlet gas comprising hydrogen sulfide with a liquid mixture comprising water and iodine in a reactive absorber to produce an effluent comprising hydriodic acid and water;

providing a reactive distillation system comprising a reactive distillation column, a reboiler, and a reflux condenser;

processing an inlet mixture of hydriodic acid and water derived from the reactive absorber effluent in the reactive distillation column under conditions to create an ascending vapor phase of the hydriodic acid and a descending liquid phase of hydriodic acid and water;

directing the liquid phase of hydriodic acid and water through an outlet at the bottom of the column into the reboiler where the hydriodic acid and water are partially vaporized and returned to the column and the remaining liquid exits the system; and directing the vapor phase through an outlet at the top of the column into a reflux condenser where the vapor phase is partially condensed with the liquid portion returned to the column and the remaining hydrogen-rich vapor exiting the system.

2. The method of claim 1, wherein the reboiler comprises a kettle reboiler, thermosyphon, fired reboiler, or forced circulation reboiler.

3. The method of claim 1, wherein the reflux condenser comprises a shell and tube heat exchanger, plate heat exchanger, or double pipe heat exchanger with coolant in either co-current or counter-current flow.

4. The method of claim 1, wherein the reactive distillation column is a staged column or a packed bed column.

5. The method of claim 1, further comprising at least one secondary purification unit comprising a packed bed column, a pressure swing adsorption bed, or a scrubber.

6. The method of claim 5, wherein the at least one secondary purification unit is a secondary hydrogen purification unit.

7. A method for decomposition of hydriodic acid into hydrogen gas, comprising:

reacting a sour inlet gas comprising hydrogen sulfide with a liquid mixture comprising water and iodine in a reactive absorber to produce an effluent comprising hydriodic acid and water;

decomposing hydriodic acid and water from the reactive absorber effluent using a reactive distillation system comprising a reactive distillation column, a reboiler, and a reflux condenser; and collecting hydrogen gas.

8. The method of claim 7, wherein at least one of:

(a) wherein the reboiler comprises a kettle reboiler, thermosyphon, fired reboiler, or forced circulation reboiler;

(b) wherein the reflux condenser comprises a shell and tube heat exchanger, plate heat exchanger, or double pipe heat exchanger with coolant in either co-current or counter-current flow;

(c) wherein the reactive distillation column is a staged column or a packed bed column; and (d) further comprising a secondary hydrogen purification unit.

9. A method for producing and purifying hydrogen from hydriodic acid using a system comprising:

a reactive absorber configured to react a sour inlet gas comprising hydrogen sulfide with a liquid mixture comprising water and iodine and produce an effluent comprising hydriodic acid and water;

a reactive distillation system comprised of a column, reboiler, and reflux condenser where the inlet stream is derived from the effluent and is composed of a mixture of hydriodic acid and water, with hydriodic acid concentration, between about 5 wt % to about 62 wt %, and at least one secondary hydrogen purification unit comprising a packed bed column, a pressure swing adsorption bed, or a scrubber.

10. The method of claim 9, wherein the packed bed column is a packed bed column using water or caustic as the absorbing liquid.

11. The method of claim 10, wherein the packed bed column comprises packing material selected from ceramics, glass, alumina, inert material or combination of these.

12. The method of claim 9, wherein the at least one secondary purification unit is a pressure swing purification unit comprising activated carbon, zeolite, or silica gel beds or combinations of these.

13. The method of claim 9, wherein the at least one secondary purification unit is a secondary hydrogen purification unit.

14. A single-pass reactive distillation system, comprising:

a reactive absorber configured to react a sour inlet gas comprising hydrogen sulfide with a liquid mixture comprising water and iodine to produce an effluent comprising hydriodic acid and water;

a reactive distillation column having a staged column or a packed bed column, an inlet fluidly connected to the reactive absorber to receive the effluent, a vapor phase outlet on the top of the column connected to a reflux condenser, and a liquid phase outlet on the bottom of the column connected to a reboiler, the reboiler having an outlet connected to the column and a further outlet for liquid effluent;

wherein the inlet to the column comprises a mixture of hydriodic acid and water.

15. The system of claim 14, further comprising at least one secondary purification unit comprising a packed bed column, a pressure swing adsorption bed, or a scrubber connected to an outlet of the reflux condenser.

16. The system of claim 14, wherein the reboiler comprises a kettle reboiler, thermosyphon, fired reboiler, or forced circulation reboiler.

17. The system of claim 14, wherein the reflux condenser comprises a shell and tube heat exchanger, plate heat exchanger, or double pipe heat exchanger with coolant in either co-current or counter-current flow.

18. The system of claim 15, wherein the packed bed column is a packed bed column using water or caustic as the absorbing liquid.

19. The system of claim 18, wherein the packed bed column comprises packing material selected from ceramics, glass, alumina, inert material or combination of these.

20. The system of claim 15, wherein the at least one secondary purification unit is a pressure swing purification unit comprising activated carbon, zeolite, or silica gel beds or combinations of these.

* * * * *